United States Patent
Asanuma

(10) Patent No.: US 8,650,087 B2
(45) Date of Patent: Feb. 11, 2014

(54) PRODUCT EVALUATION INFORMATION DELIVERING SYSTEM AND PRODUCT EVALUATION INFORMATION DELIVERING METHOD

(75) Inventor: Katsuhide Asanuma, Fujiyoshida (JP)

(73) Assignee: Fugaku Tsuun Co., Ltd., Tsuru-shi (JP)

( * ) Notice: Subject to any disclaimer, the term of this patent is extended or adjusted under 35 U.S.C. 154(b) by 525 days.

(21) Appl. No.: 11/916,588

(22) PCT Filed: Jun. 5, 2006

(86) PCT No.: PCT/JP2006/311208
§ 371 (c)(1),
(2), (4) Date: Dec. 5, 2007

(87) PCT Pub. No.: WO2006/134795
PCT Pub. Date: Dec. 21, 2006

(65) Prior Publication Data
US 2009/0228467 A1    Sep. 10, 2009

(30) Foreign Application Priority Data
Jun. 6, 2005    (JP) .................................. 2005-165862

(51) Int. Cl.
*G06G 1/14*    (2006.01)

(52) U.S. Cl.
USPC ...... 705/22; 705/7.34; 705/14.57; 705/14.58; 705/26.9; 705/336

(58) Field of Classification Search
None
See application file for complete search history.

(56) References Cited

U.S. PATENT DOCUMENTS

| | | | |
|---|---|---|---|
| 5,526,257 A * | 6/1996 | Lerner | 705/10 |
| 6,529,735 B1 * | 3/2003 | De Brito | 455/456.1 |
| 6,662,192 B1 * | 12/2003 | Rebane | 1/1 |
| 6,938,002 B2 * | 8/2005 | Moskowitz et al. | 705/26 |
| 7,302,429 B1 * | 11/2007 | Wanker | 1/1 |
| 2001/0018666 A1 | 8/2001 | Sugiyama et al. | |
| 2002/0022992 A1 * | 2/2002 | Miller et al. | 705/14 |
| 2002/0164004 A1 * | 11/2002 | Tamura et al. | 379/93.12 |
| 2007/0192206 A1 * | 8/2007 | Manesh et al. | 705/26 |

FOREIGN PATENT DOCUMENTS

| | | | | |
|---|---|---|---|---|
| EP | 1 122 674 A2 | | 8/2001 | |
| JP | 2002-236778 | * | 2/2001 | ............ G06Q 50/00 |
| JP | 2001-216451 A | | 8/2001 | |
| JP | 2002-189928 A | | 7/2002 | |
| JP | 2002-222302 A | | 8/2002 | |
| JP | 2002-236778 A | | 8/2002 | |
| JP | 2003-242397 A | | 8/2003 | |
| JP | 2005-25684 A | | 1/2005 | |
| JP | 2005-078326 A | | 3/2005 | |
| WO | WO 02/48896 A1 | | 6/2002 | |

* cited by examiner

*Primary Examiner* — Fateh Obaid

(74) *Attorney, Agent, or Firm* — Foley & Lardner LLP

(57) ABSTRACT

A system and a method for delivering information related to the evaluation values of products. The system includes an evaluation database (DB) for storing evaluation information; a user terminal for reading the product codes of products; and an inventory information DB for storing inventory information. The evaluation information is read, based on a product barcode obtained by the user terminal, from the evaluation DB, and a retail store within a predetermined distance from the user is searched based of the positional information (GPS) of the user terminal. Then, the inventory information DB, which is connected to the POS server of the retail store, is searched to acquire and display the inventory status of the product on the user terminal. Additionally, when the product is purchased, the evaluator who provided the evaluation information of the product is given points and paid a reward.

4 Claims, 12 Drawing Sheets

Fig.7 evaluation information DB 107

| JAN code | key portion | | evaluation ID | evaluator ID | title | evaluation | rating | renewal date | scheduled renewal date | point |
|---|---|---|---|---|---|---|---|---|---|---|
| | manufacturer name | product name | | | | | | | | |
| 4568621116179 | ○▽ records | ABC | 109521-001 | 109521 | new record ABC | best for playing while driving | 5 | 050516 | 050615 | 200 |
| ..... | ..... | ..... | ..... | ..... | ..... | ..... | ..... | ..... | ..... | ..... |

Fig.8

JAN code DB 108

| JAN code | manufacturer name | product name | |
|---|---|---|---|
| 4568862116179 | ○▽ records | ABC | |
| . | . | . | |
| . | . | . | |
| . | . | . | |
| . | . | . | |

Fig.9 evaluator information DB 109

| evaluator ID | name | adress | phone number | handle name | email address | bank account | | | |
|---|---|---|---|---|---|---|---|---|---|
| | | | | | | bank name | branch name | type of account | account number |
| 109521 | Taro Yamada | *, Shibuya, Shibuya-ku, Tokyo | 03-5982-** | Taro | taro@hyoka.*com | O× Bank | Shibuya | saving | 840**** |
| ..... | ..... | ..... | ..... | ..... | ..... | ..... | ..... | ..... | ..... |

Fig.10 member information DB 110

| registration number | name | address | phone number | email address | password | used point |
|---|---|---|---|---|---|---|
| 080952 | * Yamakawa | *, Kitashinagawa, Shinagawa-ku, Tokyo | 03-8537-**** | jiro@hyoka.*com | jiro77 | 80 |
| ..... | ..... | ..... | ..... | ..... | ..... | ..... |

Fig.11 regional retail store information DB 111

| regional code | IP adress | retail store name | address | phone number |
|---|---|---|---|---|
| 001-501-503 | 164.28.51.* | O× records shibuya store | *, Nampeidai, Shibuya-ku, Tokyo | 03-5950-**** |
| ..... | ..... | ..... | ..... | ..... |

Fig.12 inventory information DB 112

| JAN code | retail store name | inventory quantity | retail price |
|---|---|---|---|
| 4568862116179 | ○× records shibuya store | 1 | 2800 |
| . | . | . | . |
| . | . | . | . |
| . | . | . | . |
| . | . | . | . |
| . | . | . | . |

PRODUCT EVALUATION INFORMATION DELIVERING SYSTEM AND PRODUCT EVALUATION INFORMATION DELIVERING METHOD

TECHNICAL FIELD

The present invention relates to a product evaluation information delivering system and a product evaluation information delivering method for delivering information of third-party evaluation of products displayed in retail stores to users of the service. More particularly, the present invention relates to a product evaluation information delivering system and a product evaluation information delivering to users of the service method for delivering price and inventory information of products and related products stored in retail stores in the vicinity of the user terminals in conjunction with a POS (Point Of Sales) system.

BACKGROUND ART

Conventionally, such methods for delivering evaluation information of products as described in the below-listed patent documents were known.

Patent Document 1 discloses a system comprising a mobile terminal owned by a user of amusement services, storing means for storing evaluation information of the amusement services (amusement facilities) by those who used the services, judging means for judging whether the services are used, a managing server for managing the evaluation information and a charging means for charging to users who accessed the evaluation information, in which the managing server, upon receiving information specifying a particular service from a user mobile terminal, obtains evaluation information stored in the storing means, delivers the obtained evaluation information to be displayed on the user mobile terminal and charges to the user.

Patent Document 2 discloses a system comprising a mobile terminal, a database storing information on prices of products and retail stores dealing with the products and means for identifying the product and retail store targeted for search based on input information from the mobile terminal, which searches the product and retail store in the database based on the input information from the mobile terminal and allows the mobile terminal to display the retail shop dealing with the product in the specified area and the price of the product.
[Patent Document 1] Japanese patent laid-open No. 2002-236778.
[Patent Document 2] Japanese patent laid-open No. 2005-25684.

DISCLOSURE OF THE INVENTION

<Problems to be Solved by the Invention>

The prior art described in Patent Document 1 needs to have a judging means for judging whether the amusement services are used and, thus, is disadvantageous in that the system can be applied only to amusement facilities such as movie theaters and cannot be applied to music CDs, DVDs movie videos and books sold in retail stores.

The prior art described in Patent Document 2 enables a user of the system to compare the prices of products for purchase in retail stores. In this system, however, it may happen that quite many consumers using the system rush to the least expensive stores making the stores soon run out of stock. In such a situation, it is impossible for the users to know whether retail stores have products in stock unless the users visit each retail store.

Moreover, the prior art POS system only provides evaluation information, retail prices, inventory information, is not designed to provide information of products related to a scanned product, e.g. information of blouses and skirts are cannot be obtained when a cardigan is scanned. Furthermore, in the prior art system, it is not considered to give rewards to evaluators of products and, thus, it is quite difficult to obtain cooperation from many evaluators which is necessary for developing a product evaluation system.

It is an object of the present invention to solve the above-mentioned problems and thus provide a product evaluation information delivering system and a product evaluation information delivering method which enables users to receive third-party evaluation information of products and to obtain price and inventory information of products for purchase in retail stores in the vicinity of the user's location.

<Means for Solving the Problems>

In order to achieve the above objectives, the present invention provides a product evaluation information delivering system composed of a location information database storing location information of retail stores, an evaluation information database storing evaluation information of products in conjunction with product codes, and a computer comprising a processing unit receiving evaluation information of products and storing the received evaluation information into said evaluation information database, a processing unit receiving from a user terminal a product code and location information of said user terminal, a processing unit searching in said location information database retail stores located within a predetermined distance from the location of said user terminal based on the received location information of said user terminal, a processing unit obtaining inventory information of product of the received product code in the searched retail store by communicating with a POS system installed in the retail store, a processing unit obtaining evaluation information of the product of the received product codes from said evaluation information database, a processing unit sending to said user terminal the location information of the searched retail stores, the inventory information of the products stocked in said retail stores and the evaluation information of said products.

The product evaluation information delivering system according to the present invention is characterized in that the computer further comprises a processing unit storing into evaluation information database evaluation information and product codes of the products relating to the product of said received product code, a processing unit searching in said evaluation information database evaluation information of the related products and a processing unit sending to the user terminal the inventory information of the searched related products.

The product evaluation information delivering system according to the present invention is characterized in that the system further comprises an evaluator information database storing evaluation information of evaluators providing the evaluation information of products, and that the computer further comprises a processing unit storing in said evaluator information database points rewarded to each evaluator when the evaluation information of the products provided by the evaluator is used.

The present invention further provides a product evaluation information delivering method for delivering evaluation information of products by utilizing a location information database storing location information of retail stores, an evaluation information database storing evaluation information of products in conjunction with product codes, and a computer accessing said location information database and said evaluation information database, the computer implementing the steps of receiving evaluation information of products and storing the received evaluation information into said evaluation information database, receiving from a user terminal a product code of a product and location information of said user terminal, searching in said location information database retail stores located within a predetermined distance from the location of said user terminal based on the received location information of said user terminal, obtaining inventory information of product of the received product code in the searched retail store by communicating with a POS system installed in the retail store, obtaining evaluation information of the product of the received product codes from said evaluation information database and sending to said user terminal the location information of the searched retail stores, the inventory information of the products stocked in said retail stores and the evaluation information of said products.

The product evaluation information delivering method according to the present invention is characterized in that the computer further implements the steps of storing into evaluation information database evaluation information and product codes of the products relating to the product of said received product code, searching in said evaluation information database evaluation information of the related products and sending to the user terminal the inventory information of the searched related products.

The product evaluation information delivering method according to the present invention is characterized in that, utilizing an evaluator information database storing evaluation information of evaluators providing the evaluation information of products, the computer further implements the step of storing in said evaluator information database points rewarded to each evaluator when the evaluation information of the products provided by the evaluator is used.

Effects of the Invention

The product evaluation information delivering system and the product evaluation information delivering method according to the present invention in which an evaluation information DB storing evaluation information of products is employed to deliver the evaluation information to user terminals, thereby allowing users to refer to the evaluation information of products for purchase. According to the present invention, it is possible to search in the location information DB retail stores located within a predetermined distance from the location of the user terminal and deliver the inventory information of the searched retail stores to the user terminal, thereby allowing the user to know the inventory information of the retail stores located in a particular area. According to the present invention, it is possible to reward points to the evaluators when a product is purchased in conjunction with the evaluation information by the evaluator.

BRIEF DESCRIPTION OF THE DRAWINGS

[FIG. 7] A view of data structure of an evaluation information database.
[FIG. 8] A view of data structure of a JAN code database.
[FIG. 9] A view of data structure of an evaluator information database.
[FIG. 10] A view of data structure of a member information database.
[FIG. 11] A view of data structure of a regional retail store information database.
[FIG. 12] A view of data structure of an inventory information database.

DESCRIPTION OF THE REFERENCE NUMERALS

101: processing server, 102: user terminal, 103: public network, 104: evaluator terminal, 105: POS server installed in retail stores, 106: POS terminal, 107: evaluation information DB, 108: JAN code DB, 109: evaluator DB, 110: member information DB, 111: regional retail store information DB, 112: inventory information DB, 120: communication means of mobile phone carrier, 121: product, 122: wireless network, 123: seal or wrapping printed with product code or IC tag memorizing product code Best Mode for Carrying out the Invention A method for delivering evaluation information using an evaluation information delivering system according to an embodiment of the present invention will be below described.

Figure 1:
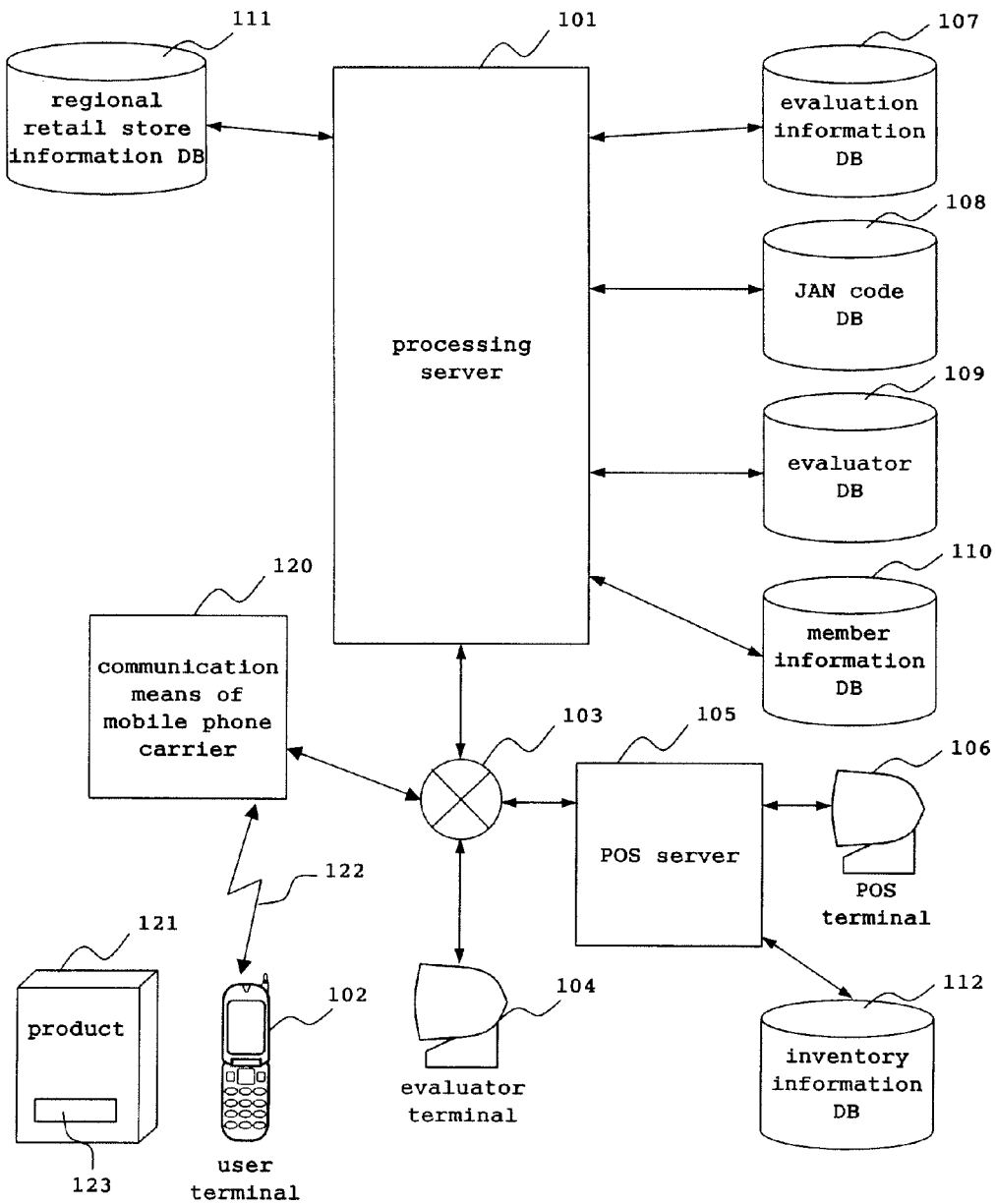
[FIG. 1] An overall schematic view of a system according to the present invention.
Figure 2:
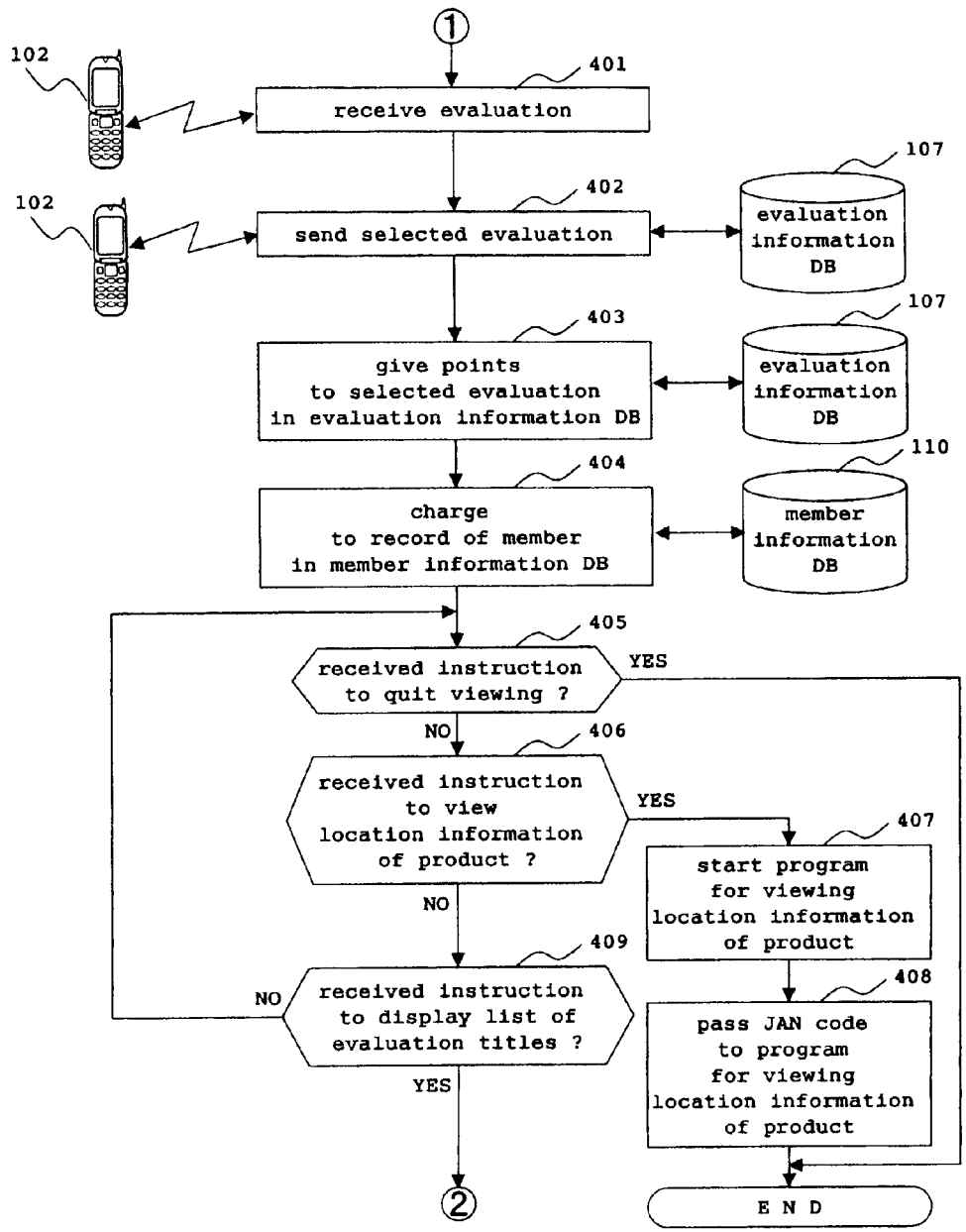
[FIG. 2] A flow chart of an evaluation information registration program.
Figure 3:
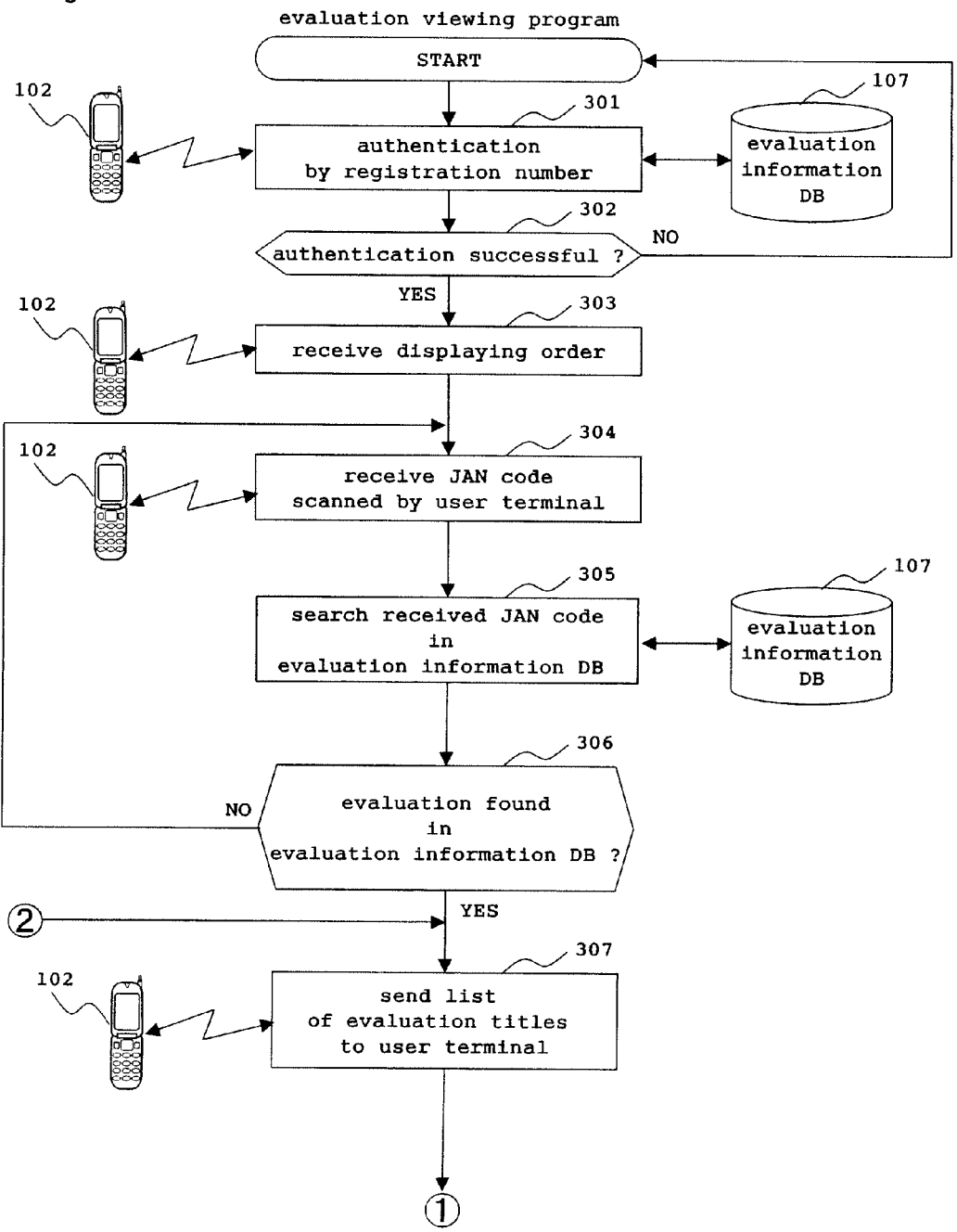
[FIG. 3] A flow chart of an evaluation information delivery program.
Figure 4:
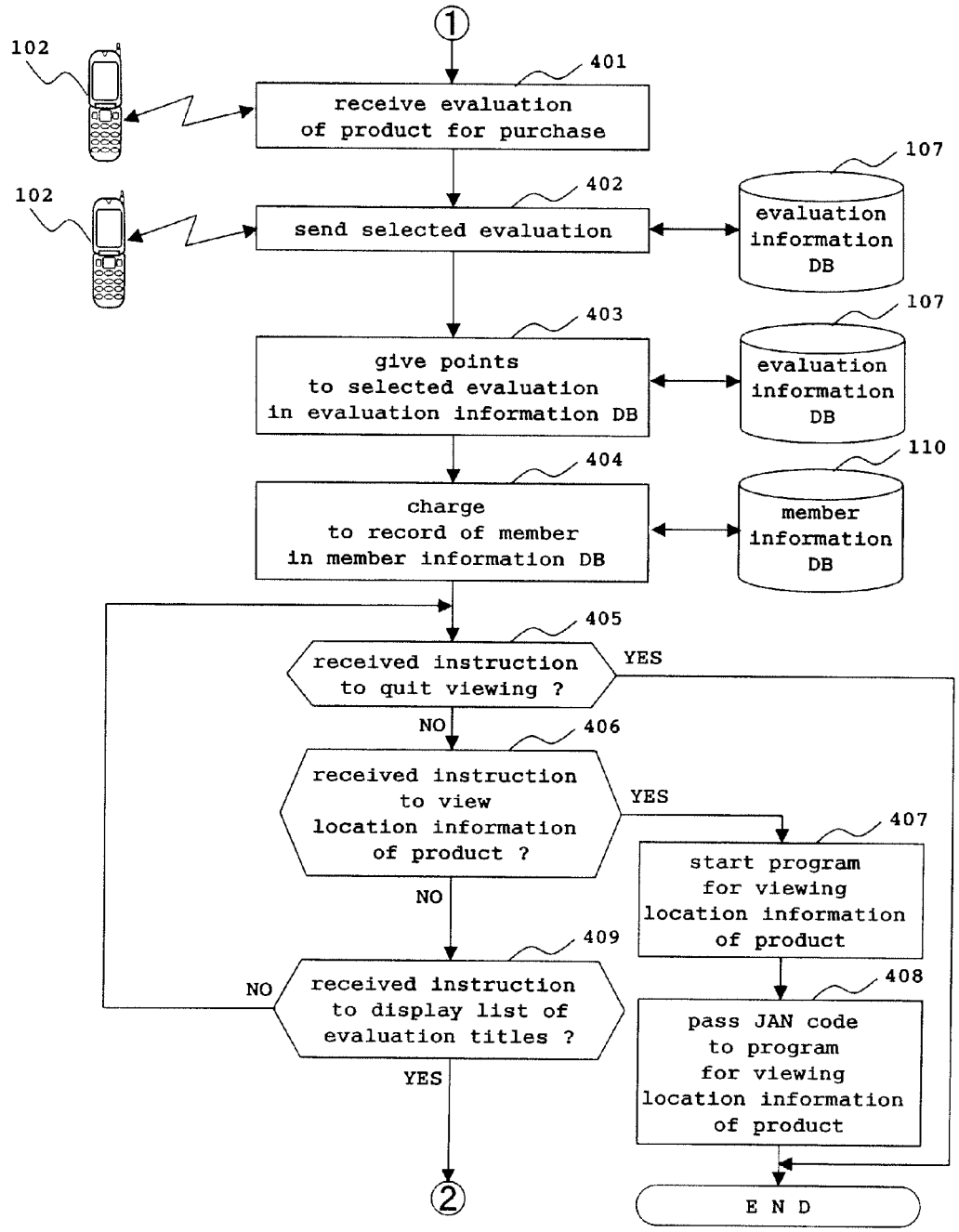
[FIG. 4] A flow chart of an evaluation information delivery program.
Figure 5:
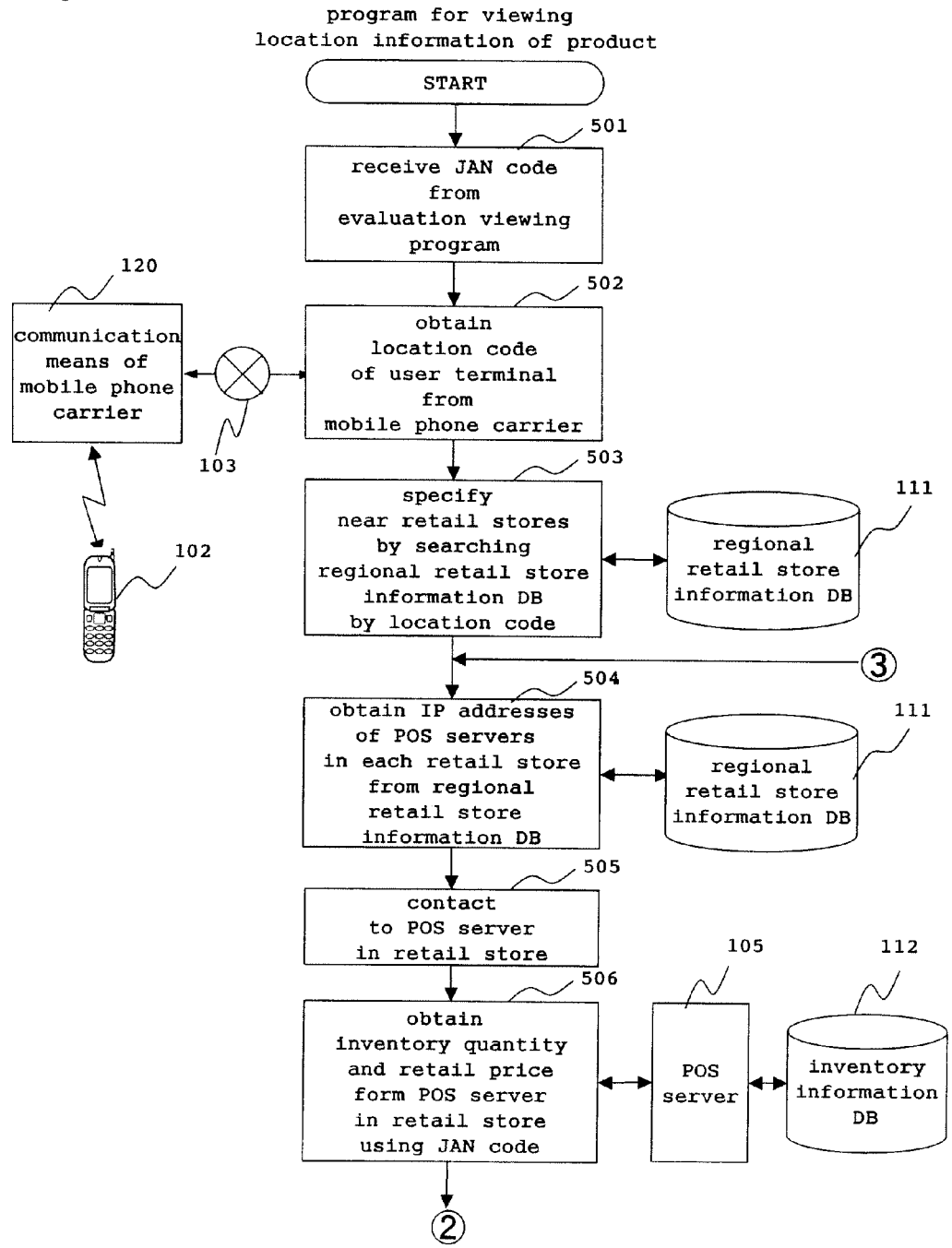
[FIG. 5] A flow chart of a location information delivery program.
Figure 6:
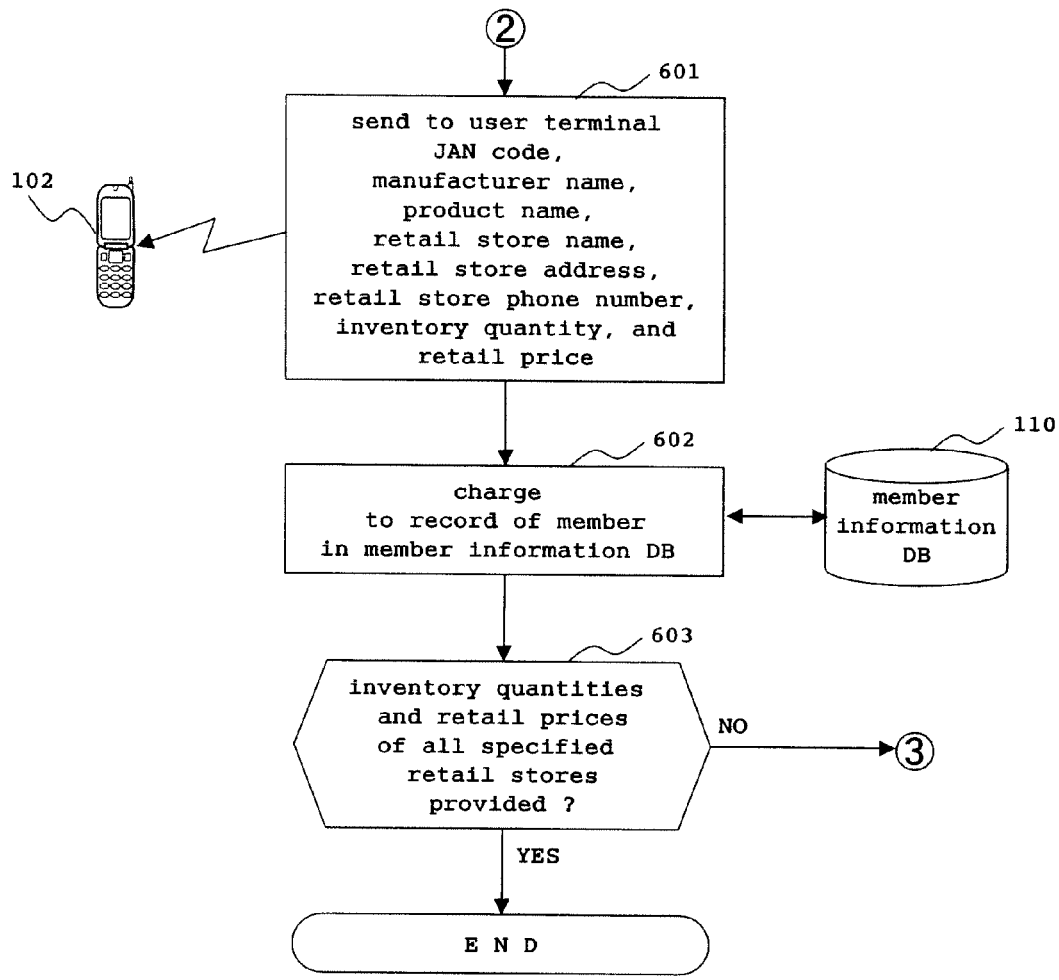
[FIG. 6] A flow chart of a location information delivery program.

FIG. 1 is an overall schematic view of a system according to the present invention. FIG. 2 is a flow chart of an evaluation information registration program. FIG. 3 is flow chart of an evaluation information delivery program. FIG. 4 is a flow chart of an evaluation information delivery program. FIG. 5 is a flow chart of a location information delivery program. FIG. 6 is a flow chart of a location information delivery program. FIG. 7 is a view of data structure of an evaluation information database. FIG. 8 is a view of data structure of a JAN code database. FIG. 9 is a view of data structure of an evaluator information database. FIG. 10 is a view of data structure of a member information database. FIG. 11 is a view of data structure of a regional retail store information database. FIG. 12 is a view of data structure of an inventory information database.

<Definition of Terms>

The terms used herein will be below described.

"JAN (Japanese Article Number) code" is a standard code products used for barcodes or the like. The JAN code consists of digits and includes a country code, a manufacturers code and an article code, which is assigned uniquely to each product.

"GTIN (Global Trade Item Number) code" is a product code similar to the JAN code which is proposed to be a product code integrating the UCC code used in Northern America and the EAN code used in Europe.

"Ucode"" is a product code similar to the JAN code which is uniquely assigned to each distribution lot of products. By using the ucode, it is possible to identify the latest mode of a product.

A product code is a code identifying a product or a distribution lot of a product including but not limited to the above mentioned JAN code, GTIN code and ucode.

"POS system" is an abbreviation of Point Of Sales system which manages sales volume of each product at the point of sales.

"Communication means of mobile phone carrier" is a communication device intermediating between a sender and a recipient of mobile phone (user terminal) at least having a function to forward to a processing server a code identifying the communication base station nearest to a user terminal or a GPS code (location information of a user terminal) received on a user terminal.

"Affiliate" generally means association or partnership and the term "affiliate point" hereinafter used means a point given to an evaluator as a reward when a user (customer) purchases a product referring to the evaluation information by the evaluator.

<Description of Construction>

An evaluation information delivering system in conjunction with a POS system according to an embodiment of the present invention will be below described referring to FIG. 1. The embodiment of the present invention is not limited to the instant embodiment. Although the JAN code is adopted in the instant embodiment, other product codes may by adopted.

The evaluation information delivering system according to the present invention comprises a processing server 101 implementing various programs describe below, a regional retail store DB 111 storing regional codes identifying regions districted according to the locations of mobile base station or GPS (Global Positioning Systems) codes and an IP address of a POS server and the like, a POS server 105 connected to a POS terminal 106 and an inventory information DB 112 storing information of inventory quantities/retail prices corresponding to each JAN code and each retail store, a communication network 103 connecting the processing server 101, the POS server 105 and an evaluator terminal 104 each other, and a user terminal (mobile phone) 102 reading a barcode 123 on a product 121.

The processing server 101 implementing various programs of the evaluation information delivering system according to the present invention is connected to an evaluation information DB 107 storing data of product evaluation for each JAN code, a JAN code DB 108 storing JAN codes/manufacturer names/product names, an evaluator information DB 109 storing information of evaluators, a member information DB 110 storing information of members, and the regional retail store DB 111 storing regional codes identifying regions districted according to the locations of mobile base station or GPS (Global Positioning Systems) codes and an IP address of a POS server and the like. Although only one POS server is shown in the figures, two or more POS servers may be connected to the evaluation information delivering system.

The processing server 101 is further connected to, via public network 103, an evaluator terminal 104 of an evaluator, a communication means of mobile phone carrier 120 and a user terminal 102 which is connected to the communication means of mobile phone carrier 120 via public network 122.

The user terminal 102 has a function of reading a barcode or an IC tag, and a GPS code in case GPS is used. The user terminal 102 also is installed with applications necessary to communicate with the processing sever 101 and a the communication means of mobile phone carrier. Furthermore, the user terminal 102 has an internet connection. The product 121 sold at stores is printed with a barcode or tagged with an IC tag 123 indicating the JAN code of the product.

<Description of Databases>

Below described is examples of various databases.

As shown in FIG. 7, the evaluation information DB 107, for example, stores "JAN code", "manufacturer name" of those manufacturing the products, "product name" of the products, "evaluation ID" identifying the evaluations, "evaluator code" identifying the evaluators, "title" of the evaluations, "evaluation" of the products, "rating" of the evaluated products, "renewal date" of the evaluation renewed, "scheduled renewal date" indicating the schedule of renewing the evaluation, and "point" given to the evaluation. In the instant embodiment, "JAN code"/"manufacturer name"/"product name" are referred to as a key portion.

As shown in FIG. 7, the examples of the record items in the evaluation information DB 107 are such as "4568862116179" for "JAN code", "○∇ records" for "manufacturer name", "ABC" for "product name", "109521-001" for "evaluation ID", "109521" for "evaluator code", "new record ABC" for "title", "best for play while driving" for "evaluation", "5" for "rating", "050516" for "renewal date", "050615" for "scheduled renewal date" and "200" for "point".

As shown in FIG. 8, the JAN code DB 108 includes record items such as "JAN code", "manufacturer name" of those manufacturing the products and "product name" of the products. The examples of the record items in the JAN code DB 108 are such as "4568862116179" for "JAN code", "○∇ records" for "manufacturer name", "ABC" for "product name".

As shown in FIG. 9, the evaluator information DB 109 includes record items such as "evaluator code" identifying the evaluators, "name" of the evaluators, "address" of the evaluators, "phone number" of the evaluators, "handle name" of the evaluators, "email address" of the evaluators, "bank name", "branch name", "type of account" and "account number" of the evaluators' bank account.

As shown in FIG. 9, the examples of the record items in the evaluator information DB 109 are such as "109521" for "evaluator code", "Taro Yamada" for "name", "Shibuya, Shibuya-ku, Tokyo" for "address", "03-5982-****" for "phone number", "Taro" for "handle name", "taro@hyoka.*com" for "email address", "○X bank" for "bank name", "Shibuya" for "branch name", "Saving" for "type of account" and "8407****" for "account number".

As shown in FIG. 10, the member information DB 110 includes record items such as "registration number" uniquely identifying the members, "name" of the members, "address" of the members, "phone number" of the members, "email address" of the members, "password" for logging in the system and "used point" corresponding to the total amount of evaluation the member viewed.

As shown in FIG. 10, the examples of the record items in the member information DB 110 are such as "08952" for "registration number", "Yamakawa **" for "name", "Kitashinagawa, Shinagawa-ku, Tokyo" for "address", "03-8537-**" for "phone number", "jiro@hyoka.*com" for "email address", "jiro77" for "password" and "80" for "used points".

As shown in FIG. 11, the regional retail store information DB 111 includes record items such as "region code" uniquely assigned to each mobile communication base station, "IP address, of the POS servers installed in the retail stores, "retail store name" of the retail stores installed with the POS server, "address" of the retail stores and "phone number" of the retail stores.

As shown in FIG. 11, the examples of the record items in the regional retail store information DB 111 are such as "001-501-503" for "region code", "164.28.51.*" for "IP address", "○X records Shibuya store" for "retail store name", "Nampeidai, Shibuya-ku, Tokyo" for "address" and "03-5950-****" for "phone number".

As shown in FIG. 12, the inventory information DB 112 includes record items such as "JAN code" of the products, "retail store name" of the retail stores located within a predetermined distance from the user's location, "inventory quantity" of the products stoked in the retail store and "retail price" of the products at the retail stores. The above mentioned "predetermined distance" is a distance easily walked by the uses, i.e. a distance walked within 5 minutes (0~400 m). Also, retail stores located in the same shopping mall may be considered to be within the predetermined distance from each other, and when the user drives an automobile, the predetermined distance may be a distance within 10 to 15 minutes' ride.

As shown in FIG. 12, the examples of the record items in the regional retail store information DB 111 are such as "4568862116179" for "JAN code", "○X records Shibuya store" for "retail store name", "1" for "inventory quantity" and "2800" for "retail price".

<Description of Programs>

<Evaluation Generating Program>

This program, implemented on the processing server 101, generates evaluation information of products and stores it in the evaluation information DB 107. The operation (procedure) of the evaluation generating program is below described with reference to FIG. 2.

The evaluation generating program instructs the processing server 101 to sequentially execute the steps of:

step 201 searching in the evaluation information DB 107 for a record of the product for which evaluation is provided by the evaluator terminal 104 via the public network 103;

step 202 judging whether a record of the product to be evaluated is found in the search of step 201;

step 203 storing, in case a record for search was found, in the evaluation information DB 107 a new record generated by combining the key portion of the searched record with the evaluator code, the title, the evaluation, the rating, the renewal date and the scheduled renewal date (hereinafter referred to as "evaluation information");

step 204 searching, in case a record for search was not found, in the JAN code DB 108 for the product to be evaluated using its JAN code as a key;

step 205 judging whether a record of the product searched is found in the search of step 204 and returning to step 201 in case no such record in found; and step 206 storing, incase a record for search was found, in the evaluation information DB 107 a new record generated by combining the JAN code/the manufacturer name/the product name with the evaluator code/the title/the evaluation/ the rating/the renewal date/the scheduled renewal date. The above mentioned evaluator code/the title/the evaluation/ the rating/the renewal date/the scheduled renewal date, as well as the product for search, are inputted by the evaluator terminal 104 via the public network 103.

<Evaluation Viewing Program>

This program, implemented on the processing server 101, allows a user to view evaluation information of products. The operation (procedure) of the evaluation viewing program is below described with reference to FIG. 3.

The evaluation viewing program, when the processing server 101 is accessed by the user terminal 102 operated by a user, implements the steps of:

step 301 searching in the member information database 110 for registration number and authentication information;

step 302 judging whether the authentication was successful in the searching step 301;

step 303 receiving, in case the authentication was successful, information of the order of displaying the evaluations on the user terminal 102;

step 304 receiving the JAN code of the product scanned by the user terminal 102;

step 305 searching in the evaluation information DB 107 for the received JAN code as a key;

step 306 judging whether evaluation of the product corresponding to the JAN code used as a key for search is found and returning to step 304 in case no such evaluation is found; and step 307 sending, in case evaluation is found in step 306, to the user terminal 102 a list of the evaluator/the evaluation ID/the title in the order specified in step 303. In case the authentication is failed in step 302, the process returns to step 301.

The operation (procedure) of the evaluation viewing program is further described with reference to FIG. 4.

The evaluation viewing program implements the steps of:

step 401 receiving from the user terminal 102 the evaluation ID corresponding to the evaluation of product purchased;

step 402 sending to the user terminal 102 the evaluation corresponding to the received evaluation ID searched and obtained from the evaluation information DB 107;

step 403 storing the points added to the pertinent record in the evaluation information DB 107;

step 404 storing the used points added to the pertinent record in the member information DB 110;

step 405 judging whether an instruction to quit viewing evaluation is received from the user terminal 102 and terminating the process in case such instruction is received;

step 406 judging, in case no such instruction is received, whether an instruction to view the location information of a product is received;

step 409 judging, in case no such instruction is received, whether an instruction to display a list of evaluation titles is received and returning to step 405 in case no such instruction is received, and going to step 307 shown in FIG. 3 in case such instruction is received;

step 407 starting a program for viewing the location information of the product in case an instruction to view the location information of a product is received in step 406; and step 408 sending to the program for viewing the location information of the product the JAN code scanned by the user terminal 102 and terminating the present evaluation information viewing program.

In the instant embodiment, location information of a product means a location of a retail store located in the vicinity of a user and dealing with a product for which evaluation information is viewed. The inventory information means the stocks of products retained in retail stores.

This evaluation viewing program may operate in such a way that the processing server 101 receives a JAN code of a related product when the related product described in an evaluation linked to its JAN code is clicked in step 406, starts the program to view the location information of the product instep 407, passes the location information of the product together with the received JAN code to step 408, and returns step 401 in case no JAN code of a related product is received. Also, in the instant embodiment, image data of the target product and the product related thereto as well as the JAN code may be passed to step 408 such that the user's buying motivation is promoted.

<Program to View Location Information of Product>

This program is executed by the processing server to allow a user to view location information of a product selected by the user. The operation (procedure) of the program to view location information of product is below described with reference to FIG. 5.

This program implements the steps of:

step 501 receiving from the evaluation viewing program a JAN code of a product read by the user terminal 102;

step 502 receiving from the mobile carrier communication means 120 via the public network 103 location information obtained by the location code (location information of the user terminal) of the user terminal 102 or by using the GPS function;

step 503 searching in the regional retail store information DB 111 for the location code (location information of the user terminal) as a key and specifying the retail stores located in the vicinity based on the location information of the retail stores;

step 504 obtaining the IP addresses of the specified retail stores by from the regional retail store information DB 111;

step 505 connecting to the POS servers 105 specified;

step 506 searching in the inventory information DBs 112 each connected to the POS servers 105 for the JAN code read by the user terminal 102 and obtaining the inventory quantity and the retail price of the product; and step 507 going to step 307.

In step 506, the searching and obtaining is implemented for all the specified retail stores.

In case GPS is used, the step 504 of obtaining the IP addresses of the specified retail stores may be implemented by searching in the regional retail store information DB 111 storing the longitudes and latitudes of the retail stores (location information of the retail stores) for the retail stores located at a predetermined distance from the present location of the user terminal 102 based on the longitude and latitude of the user terminal 102 obtained from the GPS of the mobile carrier communication means 120 and searching in the regional retail stores DB 111 for the IP addresses of the POS servers of the searched retail stores.

Otherwise, the system utilize a service provide by the mobile carrier which delivers information of names and addresses of the registered retail stores which are located at a predetermined distance from the present location of the user terminal 102. By utilizing such a service, he IP addresses of the POS servers 105 can be obtained by searching in the regional retail stores DB 111 for the retail stores located at a predetermined distance from the present location of the user terminal 102 which are specified based on by the service.

The operation (procedure) of the program to view location information of product is further described below with reference to FIG. 6.

This program implements the steps of:

step 601 sending to the user terminal 102 a list of retail store names, retail store addresses, retail store phone numbers, as well as the inventory information and the retail prices obtained in the above process, for each product;

step 602 charging to the used point of the member record in the member information DB;

step 603 judging whether all the specified retail stores are examined for the inventory information and the retail prices; and step 603 returning to step 504 in FIG. 5 in case not all the specified retail stores are examined and terminating the process in case all the specified retail stores have been examined.

<Description of Overall Operation>

The operation of the product evaluation information delivering system according to the present invention is below described with reference to FIG. 1. The product evaluation information delivering system shown in FIG. 1 operates using the product evaluation generating system shown in FIG. 2 in condition that the evaluation information DB 107 stores the evaluation information provided by the evaluators and received from the evaluator terminals 104 via the public network 103 and the user has scanned the barcode label and/or the IC tag on the product 121 using the user terminal 102 in the retail store.

In the embodiment, the products are not limited to the general products having the product codes in the form of barcodes and IC codes attached thereto, but may also include, for example, tickets of movies, concerts or other live performances having the product codes in the form of barcodes and IC codes attached thereto.

In the product evaluation information delivering system of the instant embodiment, the processing server 101, by executing the above-mentioned evaluation viewing program (FIG. 3), receives from the user terminal 102 the product code scanned by the user terminal 102, authenticates the membership (steps 301 to 302 in FIG. 3), searches the evaluation information DB 107 using the received JAN code as a key (step 304), obtains the evaluation information of the product (steps 305 to 307) and sends to the user terminal 102 the titles listed in the order designated by the user, e.g. in the order of descending views (step 307), such that the user terminal 102 receives the sent information (step 401 in FIG. 4). Furthermore, the processing server 101, by executing the above-mentioned program to evaluation location information of product shown in FIG. 4, searches the regional retail store information DB 111 based on the location information of the user terminal 102 to specify the IP addresses of the POS servers in the retail stores in the vicinity of the user terminal 102 (step 504 in FIG. 5), obtains from the inventory information DB 112 the inventory quantities and retail prices of the searched product in the specified retail stores (step 506) and sends the obtained inventory quantities and retail prices to the user terminal 102 (step 601).

In case the user received more than one records of evaluation information, the user can choose from the records of evaluation information. For example, the user may choose the records of evaluation information provided by popular evaluators or evaluators with similar values. When the user chose from more than on records of the evaluation information, the system sends to the processing server 101 the evaluation ID of the chosen record(s) of evaluation information (step 402).

The processing server 101 obtains from the evaluation information DB 107 the evaluation information of the received evaluation ID, sends the obtained the evaluation information to the user terminal 102 and increases the evaluation points of the evaluation information in the evaluation information DB 107 (step 403 in FIG. 4). The evaluation points are counted up by month, for example, reward information is generated based on the evaluation points obtained in the month and reward is given to the evaluators by the administrator of the system.

In the present invention, the evaluator information DB 109 may store the evaluation information of the evaluators. For example, when a product is purchased referring to the evaluation information o f the product, the POS terminal 106 inputted the purchase information of the product operates to allow the system to store in the evaluator information DB 109 affiliate points (points given as a reward for the evaluation information being referred to by the user when purchasing the product) give to the corresponding evaluator. Thus, the evaluators are rewarded for providing evaluation information. In this system, it is expected that the number of evaluators will increase by rewarding the evaluators.

Purchase of product is recognized by means of an IC chip memorizing the product code attached to the product code. When the product is purchased, affiliate points are given to the evaluator on condition that the evaluation information of the product is provided, that the product is found by searching for the retail stores and that the product is purchased. When more than one records of evaluation information of a product are downloaded, the affiliate points may be distributed equally or according to a predetermined allocation.

This method of giving affiliate points are effective particularly in the sales of coordinated cloths and interior goods, sets of foodstuff for particular recipes, sets of electronic devices (e.g. amplifiers and speakers, main units and peripherals of computers) and the like because the choice of related products is important when purchasing such products. The affiliate points may be distributed in such a way that higher points are given for purchase of the related products than the points given for purchase of the target products. This is for rewarding the evaluator for stimulating the user's buying motivation for the related products other than the user's target product by providing the information of the related products. Furthermore, this method of giving affiliate points is expected to improve the quality of the evaluation information in the course of giving reward to the evaluation information and gathering a lot of evaluation information.

In this system, the evaluation viewing program charges the used points to the member record of the user in the member information DB when the user subscribes the evaluation information. The used points may be counted up by month and the fees based on the counted points are charged to the users. The fees may be covered by advertisement income for displaying advertisement on the display of user terminal 102 such that the user do not have to pay the fee.

As described in the above, the system of the present invention allows the user to know the retail prices and the inventory quantities of the product in the near retail stores after viewing the evaluation information of the product. The retail prices and the inventory quantities of the product can be obtained by searching in the inventory information DBs 112 connected to the POS servers 105 in the retail stores for the JAN code of the product. By easily obtaining the inventory information of the product, the user can avoid ending up finding the product sold out when visiting a retail store. In the above description of the programs, the user can obtain the retail prices the inventory quantities of the product only after viewing the evaluation information. However, the user may be allowed to obtain the retail prices the inventory quantities of the product without viewing the evaluation information. This is made possible by implementing step 406 in FIG. 4 immediately after the membership authentication step 301 in FIG. 3.

When the information of the related product is displayed on the user terminal 102, the evaluation information and the JAN code of the related product may be displayed such that the user can click the JAN code to view the retail prices the inventory quantities of the related product in the near retail stores.

The present invention may be embodied in such modes as described below.

[Mode 1]

A product evaluation information delivering system comprising:

an evaluator terminal inputted with evaluation information of a product;

POS servers connected to inventory information databases storing inventory information of products in retail stores;

a regional retail store location information database storing location information of the retail stores;

a user terminal reading a product code from a barcode and/or an IC tag and sending location information of the user terminal;

a processing server connected to an evaluation information database storing evaluation information of products in conjunction with the product codes; and a communication network providing connection between said evaluator terminal, said regional retail store location information database, said user terminal and said processing server;

wherein said processing server has a first function of receiving from the said user terminal a product code read from a barcode and/or an IC tag on a product and location information of the user terminal, a second function of searching in said evaluation information database for evaluation information corresponding to the received product code, a third function of searching in said regional retail store location information database for location information of the retail stores in the vicinity of said user terminal based on the receive location information of said user terminal, a fourth function of searching in the inventory information databases connected to the POS servers of the searched retail stores for inventory information of the product corresponding to the received product code, and a fifth function of sending to said user terminal the searched evaluation information, the searched location information of the retail stores and the searched inventory information.

[Mode 2]

The product evaluation information delivering system of Mode 1, wherein said evaluation information database stores evaluation information and product codes of products relating to the target products, and said processing server executes said second function to allow said user terminal to search the evaluation information of said related products and said fifth function to send to said user terminal the inventory information of said related products.

[Mode 3]

The product evaluation information delivering system of Mode 1 or 2, wherein said processing server is connected to an evaluator database storing information of evaluators of products, and said POS server executes said fifth function to, when a product is purchased, store in said evaluator database points for the evaluator who provided the evaluation information of said product.

[Mode 3]

The product evaluation information delivering system of Mode 1, 2 or 3, wherein said product code is JAN code, GTIN code or ucode.

[Mode 4]

A product evaluation information delivering method using a system comprising:

an evaluator terminal inputted with evaluation information of a product;

POS servers connected to inventory information databases storing inventory information of products in retail stores;

a regional retail store location information database storing location information of the retail stores;

a user terminal reading a product code from a barcode and/or an IC tag and sending location information of the user terminal;

a processing server connected to an evaluation information database storing evaluation information of products in conjunction with the product codes; and a communication network providing connection between said evaluator terminal, said regional retail store location information database, said user terminal and said processing server;

wherein said processing server implements a first step of receiving from the said user terminal a product code read from a barcode and/or an IC tag on a product and location information of the user terminal, a second step of searching in said evaluation information database for evaluation information corresponding to the received product code, a third step of searching in said regional retail store location information database for location information of the retail stores in the vicinity of said user terminal based on the receive location information of said user terminal, a fourth step of searching in the inventory information databases connected to the POS servers of the searched retail stores for inventory information of the product corresponding to the received product code, and a fifth step of sending to said user terminal the searched evaluation information, the searched location information of the retail stores and the searched inventory information.

[Mode 5]

The product evaluation information delivering method of Mode 4, wherein said evaluation information database stores evaluation information and product codes of products relating to the target products, and said processing server implements said second step to allow said user terminal to search the evaluation information of said related products and said fifth step to send to said user terminal the inventory information of said related products.

[Mode 6]

The product evaluation information delivering method of Mode 4 or 5, wherein said processing server is connected to an evaluator database storing in formation of evaluators of products, and said POS server implements said fifth step to, when a product is purchased, store in said evaluator database points for the evaluator who provided the evaluation information of said product.

[Mode 7]

The product evaluation information delivering method of Mode 4, 5 or 6, wherein said product code is JAN code, GTIN code or ucode.

As described in the above, the product evaluation information delivering system and method of the present invention enables the user to subscribe evaluation information of the user's choice received from the evaluation information DB 107 storing evaluation information of each product. Furthermore, the product evaluation information delivering system and method of the present invention enables to specify the retail stores in the vicinity of the user terminal 102 based on the location information of the user terminal 102 obtained from the communication means of mobile phone carrier or the user terminal 102 and to search in the inventory information DB 112 connected to the POS servers 105 in the specified retail stores for the retail prices and inventory information of a target product in the specified retail stores, such that the user is informed of the retail prices and inventory quantities of the target product in the neighborhood retail stores. The product evaluation information delivering system and method of the present invention also enables to reward the evaluators for providing evaluation information of products.

Industrial Applicability

The product evaluation information delivering system according to the present invention can advantageously provide a customer with evaluation information of the product of the customer's designation and its related products. For example, the product evaluation information delivering system according to the present invention can be beneficially applied to fashion industry for the sales of cloths, handbags and shoes; information providing industry for the delivery of information on cooking recipes of different ingredients; electric product sales industry for the sales of amplifiers and speakers, and the sales of main units and peripherals of computers.

What is claimed is:

1. A product evaluation information delivering system comprising:

retail store location information database storing longitude(s) and latitude(s) of retail stores;

an evaluation information database storing evaluation information of products in conjunction with product codes; and a computer capable of accessing said retail store location information database and said evaluation information database;

wherein said computer comprises an evaluation information storing unit storing in said evaluation information database evaluation information inputted by from a user terminal, a receiving unit receiving from a user terminal a product code of a product and longitude(s) and latitude(s) of the user terminal obtained from GPS information of the user terminal, a retail store location searching unit searching in said retail store location information database for retail stores located at a predetermined distance from the location of the user terminal using the received longitude(s) and latitude(s) obtained from GPS information of the user terminal, an inventory information obtaining unit obtaining inventory information of the product corresponding to the received product code in the searched retail stores, an evaluation information obtaining unit obtaining from said evaluation information database evaluation information of the product corresponding to the received product code, a sending unit sending to the user terminal the longitude(s) and latitude(s) of the searched retail stores, the obtained inventory information of the product and the obtained evaluation information of the product; and wherein said system further comprises an evaluator information database storing information of evaluators providing evaluation information of products, wherein said computer further comprises a point storing unit storing in said evaluator information database points given to the evaluators for providing evaluation information of products, the points given comprising higher affiliate points given for purchase of a related product related to a targeted product than affiliate points given for purchase of the targeted product.

2. The product evaluation information delivering system as set forth in claim 1, wherein said computer further comprises
a related product information storing unit storing in said evaluation information database evaluation information and product codes of products related to the targeted product,
a related product information searching unit searching in said evaluation information database for evaluation information of products related to the targeted product, and
a related product information sending unit sending to the user terminal the inventory information of the searched related product.

3. A method for delivering product evaluation information using a system comprising a retail store location information database storing longitude(s) and latitude(s) of retail stores; an evaluation information database storing evaluation information of products in conjunction with product codes; and a computer capable of accessing said retail store location information database and said evaluation information database, said method comprising:
storing in said evaluation information database evaluation information inputted from a user terminal,
receiving from a user terminal a product code of a product and longitude(s) and latitude(s) of the user terminal,
searching, via said computer, in said retail store location information database for retail stores located at a predetermined distance from the location of the user terminal using the received longitude(s) and latitude(s) obtained from GPS information of the user terminal,
obtaining, via said computer, inventory information of the product corresponding to the received product code in the searched retail stores,
obtaining, via said computer, from said evaluation information database evaluation information of the product corresponding to the received product code,
sending to the user terminal the longitude(s) and latitude(s) of the searched retail stores, the obtained inventory information of the product and the obtained evaluation information of the product, wherein said system comprises an evaluator information database storing information of evaluators providing evaluation information of products; and
storing, via said computer, in said evaluator information database points given to the evaluators for providing evaluation information of products, the points given comprising higher affiliate points given for purchase of a related product related to a targeted product than affiliate points given for purchase of the targeted product.

4. The method as set forth in claim 3, further comprising:
storing in said evaluation information database evaluation information and product codes of products related to the targeted product,
searching in said evaluation information database for evaluation information of products related to the targeted product, and
sending to the user terminal the inventory information of the searched related product.

\* \* \* \* \*